United States Patent
Brunner et al.

(10) Patent No.: US 8,048,462 B2
(45) Date of Patent: Nov. 1, 2011

(54) PROCESS FOR PRODUCTION OF HIGHLY ENRICHED FRACTIONS OF NATURAL COMPOUNDS FROM PALM OIL WITH SUPERCRITICAL AND NEAR CRITICAL FLUIDS

(75) Inventors: Gerd Brunner, Hamburg (DE); Kai Gast, Buchholz (DE); Meng-Han Chuang, Hamburg (DE); Sendil Kumar, Hamburg (DE); Philip Chan, Kaltenkirchen (DE); Wan Ping Chan, Perak (MY)

(73) Assignee: Carotech SD. BHD, Perak (MY)

( * ) Notice: Subject to any disclaimer, the term of this patent is extended or adjusted under 35 U.S.C. 154(b) by 576 days.

(21) Appl. No.: 12/278,813

(22) PCT Filed: Jan. 31, 2007

(86) PCT No.: PCT/EP2007/000802
§ 371 (c)(1),
(2), (4) Date: Oct. 24, 2008

(87) PCT Pub. No.: WO2007/090545
PCT Pub. Date: Aug. 16, 2007

(65) Prior Publication Data
US 2009/0155434 A1    Jun. 18, 2009

(30) Foreign Application Priority Data

Feb. 10, 2006  (EP) .................................. 06002687

(51) Int. Cl.
*A23D 9/007* (2006.01)
(52) U.S. Cl. ........ 426/417; 426/422; 426/424; 426/429; 426/478; 426/489; 426/492; 424/727; 210/634; 210/638
(58) Field of Classification Search .................. 426/417, 426/422, 424, 425, 429, 478, 487, 492; 554/8, 554/9; 424/727; 210/634, 638
See application file for complete search history.

(56) References Cited

U.S. PATENT DOCUMENTS

| 5,626,756 | A  | * | 5/1997  | Heidlas et al. ................ 210/634 |
| 7,923,052 | B2 | * | 4/2011  | Jirjis et al. ..................... 426/662 |
| 2004/0200774 | A1 | * | 10/2004 | Shekunov et al. ............ 210/634 |
| 2005/0274671 | A1 | * | 12/2005 | Fages et al. ................... 210/634 |
| 2006/0088644 | A1 | * | 4/2006  | Choo et al. .................... 426/601 |

FOREIGN PATENT DOCUMENTS

| DE | 196 38 459 | 3/1998 |
| DE | 10 2004 041612 | 3/2005 |
| WO | WO 2005/075614 | 8/2005 |

OTHER PUBLICATIONS

Hurtado-Benavides, A. et al. 2004. Journal of Supercritical Fluids 28:29.*
Ruivo, R. et al. 2001. Ind. Eng. Chem. Res. 40:1706.*
Polana, M. et al. 2003. Flavour and Fragrance Journal 18:429.*
Ibanez, E. et al. 2002. JAOCS 79(12)1255.*
Jungfer, M., "Gegenstromtrennung von schwerflüchtigen Naturstoffen mit überkritischen Gasen unter Verwendung von Schleppmitteln, Ph.D. Thesis." 2000, Hamburg University of Technology, Hamburg, Germany, pp. 74-75, 123-125. English Language Translation.
Jungfer, M., "Gegenstromtrennung von schwerflüchtigen Naturstoffen mit überkritischen Gasen unter Verwendung von Schleppmitteln, Ph.D. Thesis." 2000, Hamburg University of Technology, Hamburg, Germany, pp. 74-75, 123-125.
Gast, K., et al. "Purification of tocochromanols from edible oil." Journal of Supercritical Fluids, vol. 34, 2005, pp. 17-25.
Brunner, G., "Fractionation of fats with supercritical carbon dioxide." European Journal of Lipid Science and Technology., vol. 102, No. 3, 2000, pp. 240-244.

* cited by examiner

*Primary Examiner* — Carolyn Paden
(74) *Attorney, Agent, or Firm* — Roberts & Roberts, LLP

(57) ABSTRACT

From palm oil, valuable compounds like the tocochromanols, carotenoids, phytosterols and other can be derived in the new process. Fractions derived from crude palm oil, already enriched to some extent in tocochromanols, carotenoids, phytosterols, and others, are treated by supercritical fluid technology in a unique combination of counter current separation with selective adsorption and desorption using supercritical fluids.

18 Claims, 2 Drawing Sheets

PROCESS FOR PRODUCTION OF HIGHLY ENRICHED FRACTIONS OF NATURAL COMPOUNDS FROM PALM OIL WITH SUPERCRITICAL AND NEAR CRITICAL FLUIDS

BACKGROUND OF THE INVENTION

From palm oil valuable compounds like the tocochromanols, carotenoids, phytosterols, and others can be derived. Enrichment to highly concentrated fractions is hindered by the enormous number of components involved, the very low volatility, the very low solubility of many of the compounds in organic solvents, and the high viscosity of the mixtures to be processed.

As an example for the production of pre-concentrated fractions, the Carotech-process may be taken (FIG. 1). Caromin™, is a carotenoid enriched derivate of crude palm oil, containing approximately 10% of carotenoids. The integrated process for extracting carotenoids and tocotrienols (vitamin E) is carried out according to U.S. Pat. No. 5,157,142 and is summarized in FIG. 1. It involves the transesterification of crude palm oil (CPO) to methyl esters (FAME), followed by vacuum distillation and other steps, resulting in a carotene-rich layer and a tocotrienol-rich layer. The carotene-rich layer, as well as the tocotrienol-rich layer are further concentrated to produce highly concentrated products of a maximum content of 30% for carotenoids, and a maximum content of about 50% for tocochromanols, mostly tocotrienols. Further enrichment with conventional methods proved to be not possible because of the high viscosity, very low volatility, and low solubility in conventional organics solvents. Although a number of investigations have been carried out on various mixtures, mostly tocopherols, with supercritical fluids, no process was able to produce fractions of high concentrations for both the tocochromanols and the carotenoids from crude palm oil or other natural sources.

FIG. 1. Process for production of concentrated fractions of mixed carotenoid and tocotrienols (U.S. Pat. No. 5,157,142).

Carotenes, which impart the distinctive orange-red colour to palm oil, together with tocopherols contribute to the stability and nutritional value of the oil. To a great extent these and other minor constituents determine the quality characteristics of palm oil Carotenoids are often recovered from natural fat or oil, particularly from palm oil. Carotenoids can be extracted from unsaponified distillation residue. They can be also extracted employing adsorbent in some stage of the process. During the extraction, large amounts of organic solvents are needed. Adsorptive processes so far have not led to higher concentrated carotene fractions from natural sources. Reasons are the initial low concentrations, the high viscosity of carotene fractions, and the instability of carotenes on most adsorbents. Numerous attempts to design a process for producing higher concentrated fractions of carotenes have been made.

Carotenoids are the most widespread and important pigments in living organisms. The most widely known carotenes are the α-, β- and γ-carotenes, and lycopene. Beside their colour, carotenoids, especially β-carotene, are well known to possess provitamin A activity as they can be transformed into vitamin A in vitro. They have also been found to inhibit anti-cancer properties due to their ability to deactivate oxyradicals. As the carotenes are natural compounds with vitamin A property, they played a positive role in commercial applications for pharmaceutical and nutritional products synthesis. [1, 2].

Carotenoids are found in numerous vegetable oils, including groundnut oil, rapeseed oil, sunflower-seed oil and cottonseed oil. The concentration of carotenoids in these oils is generally low, less than 100 ppm. Among these, palm oil is the richest natural plant source of carotene in terms of retinol equivalent, with Malaysia contributing the highest percentage of world palm oil production. Palm oil contains the highest known concentration of carotenoids, ranging from 500 to 3000 ppm, depending on the species of the palm fruit from which the oil is obtained. [1, 2] The concentration of carotenes in crude palm oil from Malaysia varies between 500 to 700 ppm, with α- and β-carotene form up to 90% of the total carotenes. [3].

Nowadays, carotenes found on the market are chemically synthetic β-carotene or carotene extracted from algae *Dunaliella*. Since carotenoids are most probably to grow in importance and value, the recovery of carotenoids from palm oil and its byproducts becomes important. Various extracting methods for recovering carotenes from palm oil have been developed over the years including saponification, urea processing, selective solvent extraction, molecular distillation, separation by adsorption, crystallization, and transesterification followed by distillation of esters. [1,4,5].

Tocochromanols: Vitamins are important substances for the human health. They are regulating various processes in the body and have positive effects on many vital functions. In general terms vitamins act as coenzymes or pro-hormones while most of their other functions like anti-carcinogen or anti-oxidizing effects are yet to be researched. Most of the vitamins cannot be synthesized by the human body and therefore these nutrients have to be ingested with the food. Since vitamins vary in their structure and their functions, a first approach is to categorize them into water soluble and oil soluble groups. Water soluble vitamins are distributed within the whole body and there-fore they are taking effect in almost all organs, while oil soluble vitamins are mostly present in the membranes. The transport in the blood stream and the digestion of these vitamins can only be done if a sufficient amount of oil lipids and micelles are present.

Vitamin E is the generic term for eight substances from the group of the tocochromanols that possess a Vitamin E activity. The tocochromanols can be subdivided into two groups: the tocochromanols and the tocotrienols: with the tocotrienols possessing three unsaturated double bonds in their hydrocarbon chain and the tocopherols possessing a completely unsaturated hydrocarbon chain. Both tocopherol and -trienol subgroups consist of four homologous, designated as α-, β-, δ-, and γ-tocopherol (-trienol), depending on the substitutes of their chroman-ring. The tocochromanols are oil soluble anti-oxidants which are mostly found in the cell membrane of organs. γ-tocopherol has the highest anti-oxidant activity and therefore it is mostly used as anti-oxidant in the food and cosmetic industry. Nevertheless recent studys report further functions of the other tocochromanol homologous like anti-carcinogen or anti-tumor properties.

As a consequence the demand on natural tocochromanol mixtures consisting of all homologous is steadily increasing. The fruits of the malaysian oil palm possess the highest content of tocochromanols in the world. Crude palm oil (CPO) consist of 94 wt. % tryglycerides, 3-4 wt. % free fatty acids (FFA), and only 1 wt. % of the CPO consist of tocochromanols, carotenoids and phytonutrients. Palm oil is available in large quantities and at a comparatively low price. It is the largest source for tocotrienols. Tocotrienols can be recovered from the distillate fractions obtained during the refining and deodorisation of the crude palm oil. The carotenoids are destroyed during this process. It is therefore reasonable to try to recover both groups of valuble compounds in one process sequence. The most economic way would be to adsorb these compounds from the crude palm oil on an appropriate adsorbent and remove the compounds subsequently from the adsorbent. Numerous attempts have been made. So far no success was obtained. Therefore, the need for another approach led to the transesterification of the triglycerides of palm oil to fatty acid methyl esters and their removal by vacuum distillation. The further process of generating higher concentrated fractions is limited by the mentioned properties of the mixtures. The needs for a different process are obvious.

Here, supercritical fluid extraction (SFE) is an alternative to conventional extraction with organic solvents. SFE is able to yield in a solvent free extract and due to its low critical temperature can be used for the treatment of temperature sensitive substances like vitamins. Supercritical fluids can dissolve the low volatile components and carry them through any process via the gaseous phase. Furthermore, highly viscous liquid solutions dissolve a great amount of supercritical fluids, in particular carbon dioxide and propane, with the effect of a much reduced viscosity. Then, even the liquid solutions can be handled in a process.

Although these facts have each for itself been known for some time, the surprising effects for a further enrichment of the tocochromanols and the carotenoids by applying appropriate combinations of counter current SFE separation and SFE-adsorptions with subsequent selective SFE-desorption have not been recognized. The state of the art achieved so far is reviewed in the following.

STATE OF THE ART

Tocochromanols:

The research done on extraction of natural materials with supercritical carbon dioxide is increasing these days. The critical parameters of carbon dioxide is 7.4 MPa and 304.21K [6]. Because of these low critical parameters, using supercritical carbon dioxide is resulting in low operation cost and because of the low critical temperature even temperature sensitive materials can be extracted. In contrary to organic solvent, carbon dioxide is non toxical, non inflammable, and inert. Moreover, carbon dioxide is easy available and can be removed completely from the desired product without residues. The solubility of carbon dioxide can be adjusted by the density, therefore it can be adjusted to the feed material. These are the reasons for the enormous amount of research work in the field of supercritical carbon dioxide extraction. Ill'es et al. [7] and Gnayfeed et al. [8] for example were researching the extraction of red pepper and pepper oil with supercritical CO2 and subcritical propane in respect to the tocopherol and carotine content. It was found that the solubility of the supercritical carbon dioxide was not sufficient to dissolve carotine. The solubility of the tocopherols in both solvents was good, and it was possible to dissolve tocopherols in both CO2 and propane. Nagesha et al. [9] and Shishikura et al. [10] have researched the enrichment of tocopherols from soy deodorizer distillate by supercritical uid extraction. Further research work has been done on the enrichment of squalene from an intermediate of the olive oil production (Dreschner et al. [11]) and the enrichment of tocopherolacetate and tocopherol (Fleck [12]).

The adjustment of the solubility of the supercritical carbon dioxide through the density gives the supercritical extraction a high flexibility. But because of the lacking polarity of the carbon dioxide the solubility for polar substances is limited. One possibility to increase the solubility is to add a modifier to the supercritical carbon dioxide. Common modifiers are iso-propanol, ethanol and propane. It should not be neglected that an increase of solubility with modifiers is often paired with a decrease in selectivity. Thus recent studies focus on an additional adsorption process prior the supercritical extraction. Due to the additional adsorption, the selectivity of the process can be increased, since the adsorbent has a different affinity to the different components. The result is that the components are adsorbed and desorbed to a different extent. Wang et al. [13] researched the separation of α-tocopherol and squalene using a pressure swing adsorption technique with supercritical carbon dioxide as solvent. In the first stage of the process the feed is mixed with supercritical $CO_2$ and enters a column filled with silica gel at low pressure, where the feed adsorbs on the silica gel. In the second stage the adsorbt is desorbed off the silicagel with pure supercritical carbon dioxide under high pressure. During these experiments Wang et al. was able to enrich α-tocopherol from a 20 wt. % feed to 60 wt. % and squalene from 80 wt. % to 98 wt. %. Theoretical work on adsorption and desorption in supercritical carbon dioxide has been done by Reverchon et al. [14] and Goto et al. [15]. The research group of Reverchon used a Langmuir similar multi component adsorption isotherm in order to describe the adsorption behaviour of a complex terpene mixture under supercritical conditions, wheras the research group of Goto used the BET adsorption isotherm to do their simulation. Both works lead to mathematical models which are capable to simulate experimental data with a high accuracy.

Lee et al. [16] published a work on the adsorption kinetics of phospholipids from treated soy oil on regenerated clay. The research group of Lee used a reaction kinetic equation in order to describe the adsorption process by measuring the concentration before and after the adsorber. This was a totally different approach then the authors before, since no adsorption isotherm is used at all to describe the system. Nevertheless the research group of Lee was able to derive a reaction equation which is capable to predict the experimental data. The regeneration of modified clay with supercritical carbon dioxide was researched by Cavalcante et al. [17] and Carneiro et al. [18]. Modified clay is an important adsorbent in the environmental technology, since its ability to adsorb organic substances is very important in the field of water treatment. Therefore the regeneration of the clay is an important economical issue for the economical efficiency of the process. Zetzl [19] dealt with the separation of avors from lemon oil by applying a selective adsorption on silicagel followed by a desorption under supercritical carbon dioxide. The desorption curve of limonen and citral was researched and a model was introduced which described the experimental data with a high accuracy.

A patent for the separation technique of selective adsorption followed by a desorption with supercritical $CO_2$ was filed for separating terpenes out of essential oils. The European patent EP 0363971 A2 [20] describes such a process. The oil is mixed by stirring at a constant temperature with the adsorbent and then it is extracted with supercritical $CO_2$. This is possible because of the low viscosity of the treated oil.

Carotenoids:

The Japanese patent JP200226723 [21] presents a method for the enrichment of carotene from palm oil. Palm oil is first transesterified. The ester is then extracted with a hydrophilic solvent such as methanol to separated it into a concentrated ester phase. This concentrate is then applied to a column packed with silica gel to adsorb carotene. Carotene is then desorbed using hexane which contains around 4000 ppm aceton.

Adsorptive concentration of the carotene-rich concentrate was also employed in U.S. Pat. No. 6,072,092 [22], where silica gel is used as adsorbent and a large amount of non-polar solvent is used to recover carotene.

European patent EP0242148 [23] describes a similar method using silica gel or activated alumina as adsorbent and a non polar solvent containing certain amounts of polar solvents as eluant for the enrichment of carotene.

Japanese patent JP63132871 [24] describes a process to enrich carotene applying Zeolite as adsorbent and a non polar solvent, such as carbon tetrachloride as eluant.

U.S. Pat. No. 5,157,132 [25] describes a process recovering carotene from oil through transesterification and saponification. The enriched carotene can be extracted from the saponified residue with an organic solvent. The obtained residue has a carotene content of 20%. Also European patent EP1398311 [26] describes a similar process. 10% to 20% of carotene concentrate can be obtained.

German patent DE 4429506 [27] presents the extraction of carotenoids from dried material with propane or butane. It was found that the solubility of both gases can be greatly improved when a co-solvent is used.

These patents require organic solvents in a large amount as eluant and recovery of the solvents by distillation to obtain the carotenoids concentrate. In the new process only propane and supercritical $CO_2$ are used as solvents at low temperatures to obtain the concentrate. These solvents can be easily removed by expansion.

Most techniques described in literature that use supercritical carbon dioxide or other compressed gases for the enrichment of both phytosterols and tocochromanols from edible oil start from very low concentrations of the here-treated components. Hence, the main focus of these works lies on depleting the oil from substances like triglycerides or FAME, because these are the by far most prominent substances when dealing with crude or esterified oil, respectively. Additionally, most described processes are batch-wise operated. Thus, the here-described approach, starting from an already enriched palm oil derivatives and employing a combination of a continuously operated extraction column with an adsorption/desorption operation on the one side and a subsequent extraction has not yet been applied.

SUMMARY OF THE INVENTION

The vitamin compounds of the group of the tocochromanols and carotenoids are enriched from mixtures derived from natural oils in the process described below. These mixtures contain fatty acid methyl esters or fatty acid ethyl esters, squalene, monoglycerides, diglycerides, sterols, co-enzyme Q10 and the target compounds.

DETAILED DESCRIPTION OF THE INVENTION

With supercritical carbon dioxide as solvent, in a first separation sequence (FIG. 2, columns C1 and C2), from the tocochromanols or the carotenoids are removed the compounds more soluble in supercritical carbon dioxide than the target compounds at the top of a counter currently operated separation column, and the less solube soluble compounds at the bottom. This process leads to concentrations for the tocochromanols of about 70 wt.-%, and for the carotenoids of about 30 wt.-%. The details of this separation are given below.

Figure 1:
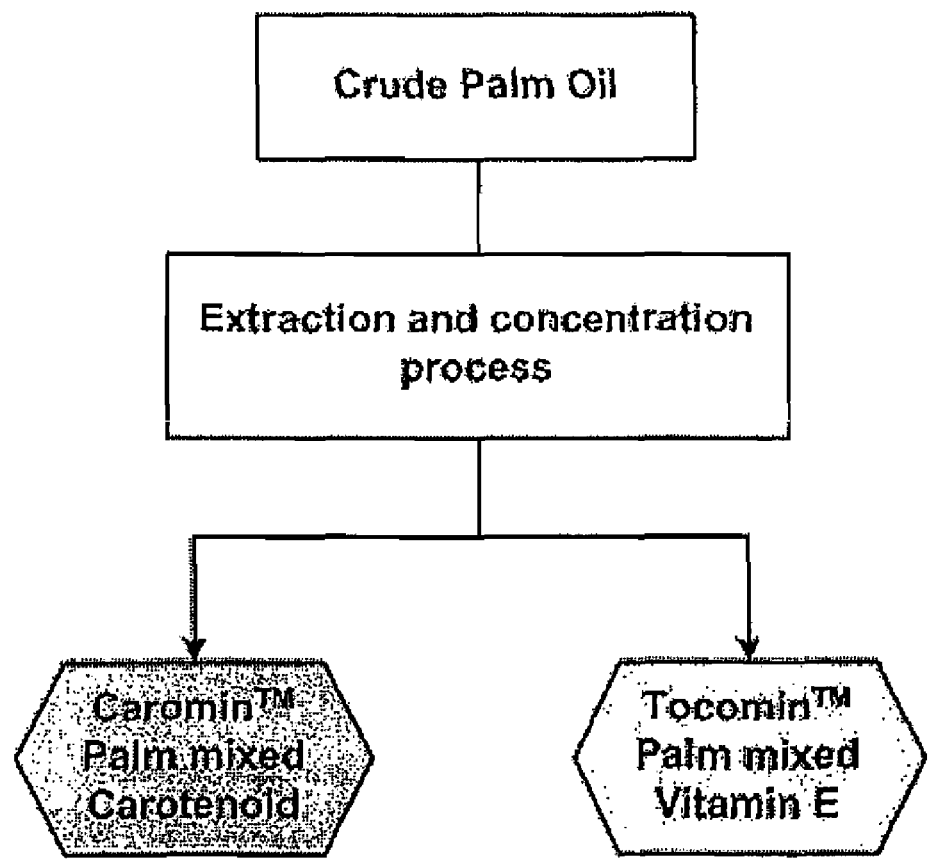
FIG. 1 shows the process of the prior art for production of concentrated fractions of mixed carotenoid and tocotrienols.
Figure 2:
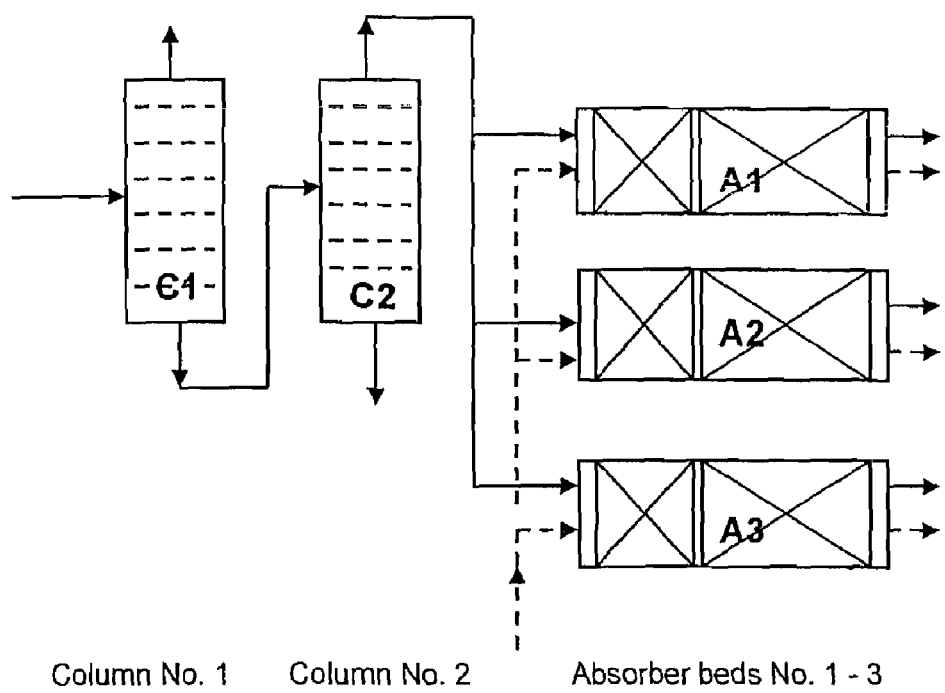
FIG. 2 shows a flow sheet of the process for concentrating tocochromanols and carotenoids by supercritical fluid extraction technology.

In a second sequence, directly following the countercurrent process, the mixtures are processed by selective adsorption and desorption steps (FIG. 2, adsorbers A1, A2, A3). Adsorption takes place from the mass flow taken from the countercurrent separation comprising a supercritical or near-critical fluid and the target compounds, and is directly deposited on the adsorbent. In this way, the handling of the highly viscous solution or solid solution is made possible. Subsequently, desorption is carried out from the fixed bed loaded with the feed mixture. Desorption may be carried out with the same supercritical or near critical fluid, or a different one, or in a sequence of two or more of such solvents. Desorption is also carried out at different conditions compared to the adsorption, i.e. different values of pressure, temperature, flow rate of gas. Supercritical or near critical solvents may comprise mixtures of supercritical or near critical fluids, preferably of carbon dioxide and propane.

It was found that the separation by adsorption and desorption can be improved by not filling the whole adsorbent with the feed mixture, but only part of it. During desorption a sequence of adsorption and desorption steps take place, which increase the separation efficiency, and thus the concentrations of the separated fractions. The ratio of the first adsorbed section to the free section of the fixed bed of adsorbent is variable, usually from 0.5 to 0.1.

FIG. 2. Flow sheet of the process for concentrating tocochromanols and carotenoids by SFE technology.

Tocochromanols

The new process for the production of highly enriched tocochromanol-fractions, containing mostly tocotrienols from palm oil derived mixtures combines a continuous countercurrent multistage separation using a supercritical fluid, preferably carbon dioxide, to remove the lighter volatile (i.e. the compounds more soluble in supercritical compound, resp. carbon dioxide) over the top of the column. The bottoms of the column are an enriched fraction in tocotrienols with a relatively high content in sterols and other somewhat polar compounds. This bottom fraction is passed over a suitable adsorbent. Silicagel was found to be an applicable adsorbent. The adsorbed mixture is desorbed by a supercritical fluid, preferably carbon dioxide in two desorption steps. The first is carried out at a pressure of about 140 bar and removes more volatile or more in supercritical carbon dioxide soluble compounds. In the second desorption step, carried out at about 250 bar, highly enriched tocochromanol fractions, containing mostly tocotrienols, are extracted. The extracted fractions can be split further by collecting them in different vessels. Depending on the cut of the fractions, the concentration of tocotrienols is in the range of 85 to nearly 100% with a yield of about 50% of the feed mixture. The adsorbent is regenerated with liquid solvents like ethanol etc. and reused for the adsorption step.

The process starts with a pre-enriched fraction, which may be obtained by several methods, one may comprise transesterification of the glycerides with methanol and removing the obtained fatty acid esters by short-path-distillation or by extraction with supercritical fluids, like carbon dioxide. For example, the starting material for the first extraction step was a palm oil derivatives that among other substances contained 56 wt.-% tocochromanols (with γ-tocotrienol, α-tocotrienol, and α-tocopherol being the major components), 16 wt.-% squalene, 5 wt-% phytosterols (with β-sitosterol and campesterol being the most prominent species), and 11 wt.-% monoand diglycerides. This material was fed into a continuously operated extraction column, employing supercritical carbon dioxide as solvent. The column was packed with a structured Sulzer EX packing and has an inner diameter of 17.5 mm and a total height of 7 m, of which 6 m are packed. Employing pressures of 20-30 MPa and temperatures of 323 to 358 K, it was possible to produce a sterol- and tocochromanol-free top product, only extracting specifically FAME, squalene, and monoglycerides, hence obtaining a bottom product enriched to about 70% tocochromanols with phytosterols and other most probably more polar compounds comprising the rest.

A longer column would have completely depleted the bottom phase from the higher-volatile components. With chemical engineering methods the necessary height for complete separation of FAME, squalene, and monoglycerides from tocochromanols, sterols, and other low-volatile components was calculated. The results are that a complete separation of these components is possible with 13 theoretical separation stages, corresponding to a height of the column of about 15 m, a solvent-to-feed ratio of 80 to 140, with a reflux ratio of 6 to 12, at a temperature of 323 K, and a pressure of 20-25 MPa.

Theoretically, the further enrichment of tocotrienols should be possible by employing another countercurrent separation using a supercritical fluid. Experimental investigations revealed that the solubility of the tocotrienol-enriched bottom product in supercritical carbon dioxide is too low to be considered as a solvent for a separation process. Therefore, modifiers were mixed with the basic supercritical fluid, carbon dioxide, in order to increase the solubility. The following solvent compositions were investigated: $CO_2$+propane with a propane content of 29, 55, and 83%, as well as $CO_2$+liquid organic solvent, namely ethanol, iso-propanol, 1-butanol, and ethyl acetate, each in a concentration of 5 and 10 wt.-%, respectively. The measurements were conducted in a pressure range of 5-30 MPa and at temperatures of 323, 343, and 358 K, respectively, in case of experiments with propane and at a fixed pressure of 20 MPa and at temperatures of 323 and 343 K in case of the liquid modifiers. At all conditions investigated the concentration of the low volatile compounds was enriched in the gaseous phase, but the selectivity with respect to tocotrienols was reduced to such an extent that sterols were dissolved in the gas-phase, hence making it impossible to enrich the tocotrienol concentration further.

Surprisingly it was found that the separation factors remained high, even increased, if the bottom material was mixed with special silica gels and then desorbed or extracted from this adsorbent with supercritical carbon dioxide. The bottom product from the first enriching step was mixed with certain amounts of adsorbent (silica gel) in a ration of 4 to 10. The mixture was introduced into a column as fixed bed. Then, applying a supercritical fluid (carbon dioxide) at a pressure of about 14 at a temperature of about 333 K, remaining high volatile components such as fatty acid esters and squalene were desorbed. In a second desorption (extraction)-step, at about the same temperature, but a higher pressure of about 25 MPa tocochromanols were desorbed with high concentration. With a ratio of adsorbent to feed of 10, a solvent ratio of supercritical carbon dioxide of about 300 [$kgCO_2$/kg Feed and hour], a fraction of 27% of the feed was obtained during 1 h with a concentration of 75% tocotrienols, after that fraction, another fraction of 25% of the feed with a 100% concentration of tocotrienols could be recovered in another hour. Experiments with a mixture of carbon dioxide and propane showed that the solubility could be enhanced while the selectivity was maintained. Therefore, the solvent ratio can be lower than with pure $CO_2$.

DESCRIPTION OF THE INVENTION

Carotenoids

A carotenoid concentrate (1 to 10 wt.-%) is fed into a continuously operated extraction device, constructed as a five-stage high pressure mixer-settler. In three separation sequences with this apparatus, employing pressures of 20-30 MPa and temperatures of 323 to 358 K, it was possible to produce a product, containing up to 30 wt.-% of carotenoids. This product is passed over the adsorbent, a special silica gel, preferably Zeofree 5170, whereby the mixture of carotenoids, sterols and other substances, and the fatty acid esters are adsorbed. The mixing ratio is in the range of 4 to 10. Subsequently, the loaded adsorbent is brought into contact first with suspercritical carbon dioxide, and then with near critical propane at conditions of the state, e.g. 5 MPa and 323 K, preferably in the range of 2 to 7 MPa and 313 to 343 K. With carbon dioxide, mainly non-carotenoids are desorbed and eluted, and with near critical propane, the carotenoids are desorbed. The solvent ratio of propane to feed is in the range of 20 to 100 preferably about 30. Concentration of the eluted carotenoids were enhanced, if during the adsorption step only a fraction of the adsorbent was loaded with the feed.

EXAMPLES

Tocochromanols

Example 1

First Extraction Step

A continuous operated multi-stage supercritical extraction was conducted with pure carbon dioxide as solvent and a feed mixture containing 50 wt.-% tocochromanols (with γ-tocotrienol, α-tocotrienol, and α-tocopherol being the major components), 16 wt.-% squalene, 3 wt-% phytosterols (with β-sitosterol and campesterol being the most prominent species), and 11 wt.-% mono- and diglycerides. The employed column had an effective height of 6 m and was packed with a structured Sulzer EX packing. Operating conditions were as follows: 20 MPa, 323 K, solvent-to-feed ratio=19.8, reflux ratio=7.3. These conditions resulted in a top phase product consisting of 2 wt.-% FAME, 58 wt.-% squalene and it was completely depleted from tocochromanols and phytosterols. The bottom product consisted of 8 wt.-% squalene, 58 wt.-% tocochromanols, 4 wt.-% phytosterols, and it was completely FAME-free.

Example 2

First Extraction Step

A continuous operated multi-stage supercritical extraction was conducted with pure carbon dioxide as solvent and a feed mixture containing 50 wt.-% tocochromanols (with γ-tocotrienol, α-tocotrienol, and α-tocopherol being the major components), 16 wt.-% squalene, 3 wt-% phytosterols (with β-sitosterol and campesterol being the most prominent species), and 11 wt.-% mono- and diglycerides. The employed column had an effective height of 6 m and was packed with a structured Sulzer EX packing. Operating conditions were as follows: 20 MPa, 343 K, solvent-to-feed ratio=40.3, reflux ratio=1.3. These conditions resulted in a top phase product consisting of 2 wt.-% FAME, 60 wt.-% squalene, 2 wt.-% tocochromanols, and 1 wt.-% sterols. The bottom product consisted of 7 wt.-% squalene, 54 wt.-% tocochromanols, 4 wt.-% phytosterols, and it was completely FAME-free.

Example 3

Production of Concentrated Fractions of Tocotrienols-1

1 g of the bottom product obtained from example 1 was used as feed material and mixed with 10 g of silica gel, Zeofree 5170. The mixture is introduced into an empty vessel and supercritical $CO_2$ was used to desorb FAME and squalene at 13 MPa and 333 K for 120 minutes. The pressure was increased to 25 MPa and after 60 minutes, a fraction (0.27 g), which contains 80 wt.-% of tocochormanols, was collected. The pressure was held constant for another 60 minutes, another fraction (0.24 g) was collected. This fraction contains approximately 100% tocochromanols.

Example 4

Production of Concentrated Fractions of Tocotrienols-2

2.4 g of the bottom product obtained from example 1 was used as feed material and mixed with 10 g of silica gel, Zeofree 5170. The mixture is introduced into an empty vessel and supercritical $CO_2$ was used to desorb FAME and squalene at 13 MPa and 333 K for 60 minutes. The pressure was increased to 19 MPa and after another 120 minutes, a fraction (1.59 g) was collected. It contains 80 wt.-% of tocochromanols.

Example 5

Carotenoids

The carotenoids concentrate containing approximately 10 wt % of carotenoids was passed over the adsorbent in an high pressure pipe with an internal volume of 50 ml. Silica gel with a minimum surface area of 165 $m^2/g$ was used as the adsorbent with a ratio of 4:1 (12 g:3 g) to the amount of feed. Extraction was then carried out first with supercritical carbon dioxide at 150 bar and 60° C., and then with supercritical carbon dioxide at 250 bar and 60° C. In third step, near critical propane was used at 7 MPa, 60° C. The fractions are collected. The last fraction consisted of about 60% carotenoids.

REFERENCES

1. Y. M. Choo: Palm Oil Carotenoids. The United Nations University Press, Food and Nutrition Bulletin, 15 (1994).
2. C. Lenfant, F. C. Thyrion: Extraction of Carotenoids From Palm Oil, I. Physical and Chemical Properties of β-Carotene, Voir OCL 3, 3 (1996) 220-226.
3. S. H. Goh, Y. M. Choo, S. H. Ong: Minor Constituents of Palm Oil, J. Am. Oil Chem. Soc. 62 (1985) 237-240.
4. B. S. Baharin, L. L. You, Y. B. Che Man, and S. Takagi: Effect of Degumming Process on Chromatographic Separation of Carotenes from Crude and Degummed Palm Oil, Journal of Food Lipids 8 (2001) 27-35.
5. C. Lenfant, F. C. Thyrion, Extraction of Carotenoids From Palm Oil, II. Isolation Methods, Voir OCL 3, 4 (1996) 294-307.
6. VDI: VDI W armeatlas. VDI Verlag GmbH (1988).
7. V. Ill'es, H. G. Daood, P. A. Biacs, M. H. Gnayfeed, B. M'esz' aros: Supercritical $CO_2$ and Subcritical Propane Extraction of Spice Red Pepper Oil with Special Regard to Carotenoid and Tocopherol Content. Journal of Chromatographic Science, Vol. 37 (1999).
8. M. H. Gnayfeed, H. G. Daood, V. Ill'es, P. A. Biacs: Supercritical $CO_2$ and Subcritical Propane Extraction of Pungent Paprika and Quantification of Carotenoids, Tocopherols and Capsaicinoids. J. Agric. Food Chem. 49, 2761-2766 (2001).
9. G. K. Nagesha, B. Manohar, K. Udaya Sankar: Enrichment of tocopherols in modified soy de-odorizer distillate using supercritical carbon dioxide extraction. Eur. Food Res. Technol. 217:427-433 (2003).
10. A. Shishikura, K. Fujimoto, T. Kaneda, K. Arai, S. Saito: Concentration of Tocopherols from Soybean Sludge by Supercritical Fluid Extraction. J. Jpn. Oil Chem. Soc. 37, No. 1 (1988).
11. M. Dreschner, M. Bonakdar: Anreicherung des Kohlenwasserstoffes Squalen in einem Zwischenprodukt der Olivenölherstellung durch Extraktion mit verdichtetem Kohlendioxid. Chemie Ingenieur Technik 73, S. 338-342 (2001).
12. U. Fleck: Reinigung schwer flüchtiger Substanzen mittels Extraktion mit überkritischen Gasen. Dissertation, Technische Universität Hamburg-Harburg (2000).
13. H. Wang, M. Goto, M. Sasaki, T. Hirose: Separation of α-Tocopherol and Squalene by Pressure Swing Adsorption in Supercritical Carbon Dioxide. Ind. Eng. Chem. Res. 43, 2753-2758 (2004).
14. E. Reverchon, G. Lamberti, P. Subra: Modelling and simulation of the supercritical adsorption of complex terpene mixtures. Chemical Engineering Science 53, 3537-3544 (1998).
15. M. Goto, B. C. Roy, A. Kodama, T. Hirose: Modelling Supercritical Fluid Extraction Process Involving Solute-Solid Interaction. Journal of Chemical Engineering of Japan 31, 171-177, (1998).
16. C. H. Lee, C. I. Lin: Kinetics of Adsorption of Phospholipids from Hydrated and Alkali-Refined Soy Oil Using Regenerated Clay. Journal of Chemical Engineering of Japan 37, 764-771 (2004).
17. A. M. Cavalcante, L. G. Torres, G. L. V. Coelho: Adsorption of Ethyl Acetate onto Modified Clays and its Regeneration with Supercritical $CO_2$. Brazilian Journal of Chemical Engineering, Vol. 22, No. 1, 75-82 (2005).
18. D. G. P. Carneiro, M. F. Mendes, G. L. V. Coelho: Desorption of Toluene from Modified Clays using Supercritical Carbon Dioxide. Brazilian Journal of Chemical Engineering Vol. 21, No. 4, 641-646 (2004).
19. C. Zetzl: Desorption von Sauerstoffverbindungen des Zitrusöls durch überkritisches $CO_2$. Diplomarbeit, Institut für Thermische Verfahrenstechnik an der Universität Karlsruhe, (1994).
20. European patent EP 0363971 A2
21. Japanese patent JP200226723
22. U.S. Pat. No. 6,072,092,
23. European patent EP0242148
24. Japanese patent JP63132871
25. U.S. Pat. No. 5,157,132
26. European patent EP1398311
27. German patent DE 4429506

The invention claimed is:

1. A process for the production of highly enriched fractions of natural compounds from Palm oil or Palm oil derivatives, comprising a first separation step comprising countercurrent multistage separation with supercritical carbon dioxide and/or near critical propane removing the higher volatile over top, yielding a bottom fraction enriched in the natural compounds, and another countercurrent multistage separation conducted on the bottom fraction enriched in the natural compounds, with supercritical carbon dioxide and/or near critical propane removing the target natural compounds over top, thus cleaning it from a bottom fraction of low volatile impurities, and a second step comprising selective adsorption and desorption by directly adsorbing the top fraction of the target natural compounds from the countercurrent separation containing the supercritical carbon dioxide and/or near critical propane on an adsorbent, and subsequently eluting the mixture from the adsorbent by the same or an other supercritical carbon dioxide and/or near critical propane and collecting different fractions.

2. The process for the production of highly enriched fractions of natural compounds from Palm oil or Palm oil derivatives, according to claim 1 using the supercritical carbon dioxide and/or near critical propane at operating conditions for the temperature of 313 to 383 K, and pressures of 5 to 45 MPa, a solvent-to-feed ratio of 1 to 500, using a reflux of extract at the top of the column in the range of 0.1 to 50.

3. The process for the production of highly enriched fractions of natural compounds from Palm oil or Palm oil derivatives, according to claim 2, wherein a second step comprising selective adsorption and desorption by directly adsorbing the fraction from the countercurrent separation containing the supercritical carbon dioxide and/or near critical propane, at the same pressure and temperature or at reduced density, on an adsorbent, silica gel, in a ratio of 4 to 10, in such a way that only some part of the adsorbent is loaded with the incoming feed material, desorption is carried out with the same or another supercritical or near critical fluid in one or more steps, in a first elution step, at lower pressure in the range of 12 to 15 MPa, the higher volatile compounds still remaining in the adsorbed mixture are removed, in subsequent second elution, at an enhanced pressure in the range of 22 to 35 MPa, at temperatures between 313 and 373 K the lower volatile compounds are extracted and a third elutions step comprises the use of near critical propane at conditions of 3 to 10 MPa.

4. The process for the production of highly enriched fractions of natural compounds from Palm oil or Palm oil derivatives, according to claim 3 wherein the natural compounds comprise tocochromanol fractions.

5. The process for the production of highly enriched fractions of natural compounds from Palm oil or Palm oil derivatives, according to claim 3 wherein the natural compounds comprise carotenoid fractions.

6. The process for the production of highly enriched fractions of natural compounds from Palm oil or Palm oil derivatives, according to claim 3 wherein the natural compounds comprise sterol fractions.

7. The process for the production of highly enriched fractions of natural compounds from Palm oil or Palm oil derivatives, according to claim 3 wherein the natural compounds comprise coenzyme Q10.

8. The process for the production of highly enriched fractions of natural compounds from Palm oil or Palm oil derivatives, according to claim 2, wherein desorption is carried out with the same or another supercritical carbon dioxide and/or near critical propane in two pressure steps, in a first elution step, the higher volatile compounds still remaining in the adsorbed mixture are removed in a second elution, at an enhanced pressure at MPa, at temperatures, and a third elution step comprises the use of near critical propane at conditions of 5 to 7 MPa.

9. The process for the production of highly enriched fractions of natural compounds from Palm oil or Palm oil derivatives, according to claim 2 wherein the natural compounds comprise tocochromanol fractions.

10. The process for the production of highly enriched fractions of natural compounds from Palm oil or Palm oil derivatives, according to claim 2 wherein the natural compounds comprise carotenoid fractions.

11. The process for the production of highly enriched fractions of natural compounds from Palm oil or Palm oil derivatives, according to claim 2 wherein the natural compounds comprise sterol fractions.

12. The process for the production of highly enriched fractions of natural compounds from Palm oil or Palm oil derivatives, according to claim 2 wherein the natural compounds comprise coenzyme Q10.

13. The process for the production of highly enriched fractions of natural compounds from Palm oil or Palm oil derivatives, according to claim 1 wherein the natural compounds comprise tocochromanol fractions.

14. The process for the production of highly enriched fractions of natural compounds from Palm oil or Palm oil derivatives, according to claim 1 wherein the natural compounds comprise carotenoid fractions.

15. The process for the production of highly enriched fractions of natural compounds from Palm oil or Palm oil derivatives, according to claim 1 wherein the natural compounds comprise sterol fractions.

16. The process for the production of highly enriched fractions of natural compounds from Palm oil or Palm oil derivatives, according to claim 1 wherein the natural compounds comprise coenzyme Q10.

17. The process for the production of highly enriched fractions of natural compounds from Palm oil or Palm oil derivatives of claim 1 wherein the natural compounds are tocotrienols, carotenoids, or sterols.

18. The process for the production of highly enriched fractions of natural compounds from Palm oil or Palm oil derivatives, according to claim 1 using the supercritical carbon dioxide and/or near critical propane at operating conditions for the temperature of between 323 and 363 K, and pressures of 10 to MPa, a solvent-to-feed ratio of 50 to 300, using a reflux of extract at the top of the column in the range of 2 to 20.

* * * * *